United States Patent
Ooms et al.

(12)

(10) Patent No.: US 6,919,293 B1
(45) Date of Patent: *Jul. 19, 2005

(54) DOUBLE METAL CYANIDE CATALYSTS FOR PRODUCING POLYETHER POLYOLS

(75) Inventors: Pieter Ooms, Krefeld (DE); Jörg Hofmann, Krefeld (DE); Christian Steinlein, Ratingen (DE); Stephan Ehlers, West Chester, PA (US)

(73) Assignee: Bayer Aktiengesellschaft, Leverkusen (DE)

( * ) Notice: Subject to any disclaimer, the term of this patent is extended or adjusted under 35 U.S.C. 154(b) by 349 days.

This patent is subject to a terminal disclaimer.

(21) Appl. No.: 10/129,579

(22) PCT Filed: Oct. 26, 2000

(86) PCT No.: PCT/EP00/10550

§ 371 (c)(1),
(2), (4) Date: May 7, 2002

(87) PCT Pub. No.: WO01/34297

PCT Pub. Date: May 17, 2001

(30) Foreign Application Priority Data

Nov. 8, 1999 (DE) .......................................... 199 53 546

(51) Int. Cl.⁷ .......................... B01J 31/00; B01J 31/02; B01J 31/06; B01J 27/26
(52) U.S. Cl. ...................... 502/175; 502/150; 502/152; 502/153; 502/155; 502/156; 502/159; 502/162; 502/167; 502/170; 502/172
(58) Field of Search ................................. 502/175, 159, 502/150, 152, 153, 155, 156, 162, 167, 170, 172

(56) References Cited

U.S. PATENT DOCUMENTS 3,404,109 A  10/1968  Milgrom
3,941,849 A  3/1976   Herold
5,158,922 A  10/1992  Hinney et al. .............. 502/175
5,470,813 A  11/1995  Le-Khac ..................... 502/175
5,482,908 A  1/1996   Le-Khac ..................... 502/156
5,627,120 A  5/1997   Le-Khac ..................... 502/156
5,637,673 A  6/1997   Le-Khac ..................... 528/405
5,712,216 A  1/1998   Le-Khac et al. ............. 502/175
5,714,428 A  2/1998   Le-Khac ..................... 502/159
5,789,626 A  8/1998   Le-Khac ..................... 568/620
6,018,017 A  1/2000   Le-Khac ..................... 528/421
6,204,357 B1 3/2001   Ooms et al. ................ 528/409
6,291,388 B1 9/2001   Hofmann et al. ........... 502/154
6,323,375 B1 11/2001  Hofmann et al. ........... 568/613

FOREIGN PATENT DOCUMENTS

| JP | 4-145123 | 5/1992 |
| WO | 98/16310 | 4/1998 |
| WO | 99/19063 | 4/1999 |
| WO | 00/15337 | 3/2000 |
| WO | 00/47649 | 8/2000 |
| WO | 00/47650 | 8/2000 |

*Primary Examiner*—Elizabeth D. Wood
(74) *Attorney, Agent, or Firm*—Joseph C. Gil; John E. Mrozinski, Jr.

(57) ABSTRACT

This invention relates to novel double metal cyanide (DMC) catalysts for the production of polyether polyols by polyaddition of alkylene oxides onto starter compound comprising active hydrogen atoms, wherein the catalyst contains a) double metal cyanide compounds, b) organic complex ligands other than c) and c) two or more complex-forming components from the classes of compounds comprising functionalised polymers, glycidyl ethers, glycosides, carboxylic acid esters of polyhydric alcohols, bile acids or the salts, esters or amides thereof, cyclodextrins, phosphorus compounds, $\alpha,\beta$-unsaturated carboxylic acid esters or ionic surface- or interface-active compounds. The catalysts according to the invention exhibit greatly increased activity in polyether polyol production.

6 Claims, No Drawings

DOUBLE METAL CYANIDE CATALYSTS FOR PRODUCING POLYETHER POLYOLS

This invention relates to novel double metal cyanide (DMC) catalysts for the production of polyether polyols by polyaddition of alkylene oxides onto starter compounds comprising active hydrogen atoms.

Double metal cyanide (DMC) catalysts for the polyaddition of alkylene oxides onto starter compounds comprising active hydrogen atoms are known (c.f. for example U.S. Pat. No. 3,404,109, 3,829,505, 3,941,849 and 5,158,922). Using these DMC catalysts for the production of polyether polyols in particular brings about a reduction in the proportion of monofunctional polyethers having terminal double bonds, so-called monools, in comparison with the conventional production of polyether polyols by means of alkali metal catalysts, such as alkali metal hydroxides. The resulting polyether polyols may be processed to yield high-grade polyurethanes (for example elastomers, foams, coatings). DMC catalysts are usually obtained by reacting an aqueous solution of a metal salt with the aqueous solution of a metal cyanide salt in the presence of an organic complex ligand, for example an ether. In one typical catalyst preparation method, aqueous solutions of zinc chloride (in excess) and potassium hexacyanocobaltate are, for example, mixed and dimethoxyethane (glyme) is then added to the resulting suspension. Once the catalyst has been filtered and washed with aqueous glyme solution, an active catalyst of the general formula

$$Zn_3[Co(CN)_6]_2 \cdot x\ ZnCl_2 \cdot y\ H_2O \cdot z\ glyme$$

is obtained (c.f. for example EP-A 700 949).

JP-A 4 145 123, U.S. Pat. No. 5,470,813, EP-A 700 949, EP-A 743 093, EP-A 761 708 and WO 97/40086 disclose DMC catalysts which, by using tert.-butanol as the organic complex ligand (alone or in combination with a polyether (EP-A 700 949, EP-A 761 708, WO 97/40086)), further reduce the proportion of monofunctional polyethers with terminal double bonds in the production of polyether polyols. Moreover, using these DMC catalysts also reduces the induction time in the polyaddition reaction of the alkylene oxides with appropriate starter compounds and increases catalyst activity.

The object of the present invention was to provide further improved DMC catalysts for the polyaddition of alkylene oxide onto appropriate starter compounds, which catalysts exhibit increased catalyst activity in comparison with hitherto known catalyst types. By shortening the alkoxylation times, this improves the economic viability of the polyether polyol production process. Ideally, by virtue of its increased activity, the catalyst may then be used in such low concentrations (25 ppm or below) that it is no longer necessary to perform the highly elaborate separation of the catalyst from the product and the product may be used directly for polyurethane production.

It has surprisingly now been found that DMC catalysts which contain three or more different complex-forming components possess greatly increased activity in polyether polyol production in comparison with catalysts containing only one complex-forming component.

The present invention accordingly provides a double metal cyanide (DMC) catalyst containing a) one or more, preferably one, double metal cyanide compounds, b) one or more, preferably one, organic complex ligands other than c), and c) two or more, preferably two, complex-forming components other than b) from the class of compounds comprising functionalised polymers selected from the group: polyethers, polyesters, polycarbonates, polyalkylene glycol sorbitan esters, polyalkylene glycol glycidyl ethers, polyacrylamide, poly(acrylamide-co-acrylic acid), polyacrylic acid, poly(acrylic acid-co-maleic acid), polyacrylonitrile, polyalkyl acrylates, polyalkyl methacrylates, polyvinyl methyl ether, polyvinyl ethyl ether, polyvinyl acetate, polyvinyl alcohol, poly-N-vinylpyrrolidone, poly(N-vinylpyrrolidone-co-acrylic acid), polyvinyl methyl ketone, poly(4-vinylphenol), poly(acrylic acid-co-styrene), oxazoline polymers, polyalkyleneimines, maleic acid and maleic anhydride copolymers, hydroxyethylcellulose and polyacetals or from among glycidyl ethers, glycosides, carboxylic acid esters of polyhydric alcohols, bile acids or the salts, esters or amides thereof, cyclodextrins, phosphorus compounds, α,β-unsaturated carboxylic acid esters or ionic surface- or interface-active compounds.

The catalyst according to the invention may optionally contain d) water, preferably 1 to 10 wt. %, and/or e) one or more water-soluble metal salts, preferably 5 to 25 wt. %, of the formula (I) M(X)n originating from the production of the double metal cyanide compounds a). In the formula (I), M is selected from among the metals Zn(II), Fe(II), Ni(II), Mn(II), Co(II), Sn(II), Pb(II), Fe(III), Mo(IV), Mo(VI), Al(III), V(V), V(IV), Sr(II), W(IV), W(VI), Cu(II) and Cr(III). Zn(II), Fe(II), Co(II) and Ni(II) are particularly preferred. The Xs are identical or different, preferably identical and an anion, and preferably selected from the group comprising halides, hydroxides, sulfates, carbonates, cyanates, thiocyanates, isocyanates, isothiocyanates, carboxylates, oxalates or nitrates. The value of n is 1, 2 or 3.

The double metal cyanide compounds a) present in the catalysts according to the invention are the reaction products of water-soluble metal salts and water-soluble metal cyanide salts.

Water-soluble metal salts suitable for the production of double metal cyanide compounds a) preferably have the general formula (I) M(X)$_n$, wherein M is selected from among the metals Zn(II), Fe(II), Ni(II), Mn(II), Co(II), Sn(II), Pb(II), Fe(II), Mo(IV), Mo(VI), Al(III), V(V), V(IV), Sr(II), W(IV), W(VI), Cu(II) and Cr(II).

Zn(II), Fe(II), Co(II) and Ni(II) are particularly preferred. The anions X are identical or different, preferably identical, and preferably selected from the group comprising halides, hydroxides, sulfates, carbonates, cyanates, thiocyanates, isocyanates, isothiocyanates, carboxylates, oxalates or nitrates. The value of n is 1, 2 or 3.

Examples of suitable water-soluble metal salts are zinc chloride, zinc bromide, zinc acetate, zinc acetylacetonate, zinc benzoate, zinc nitrate, iron(II) sulfate, iron(II) bromide, iron(II) chloride, cobalt(II) chloride, cobalt(II) thiocyanate, nickel(II) chloride and nickel(II) nitrate. Mixtures of various water-soluble metal salts may also be used.

Water-soluble metal cyanide salts suitable for the production of double metal cyanide compounds a) preferably have the general formula (II), (Y)$_g$M'(CN)$_b$(A)$_c$, wherein M' is selected from among the metals Fe(II), Fe(III), Co(II), Co(III), Cr(II), Cr(III), Mn(II), Mn(III), I(III), Ni(II), Rb(III), Ru(II), V(IV) and V(V). M' is particularly preferably selected from among the metals Co(II), Co(III), Fe(II), Fe(III), Cr(III), Ir(III) and Ni(II). The water-soluble metal cyanide salt may contain one or more of these metals. The cations Y are identical or different, preferably identical, and are selected from among the group comprising alkali metal ions and alkaline earth metal ions. The anions A are identical or different, preferably identical, and are selected from among the group of halides, hydroxides, sulfates, carbonates, cyanates, thiocyanates, isocyanates, isothiocyanates, carboxylates, oxalates or nitrates. Not only a, but also b and c are integers, wherein the values for a, b and c are selected such that electron-neutrality of the metal cyanide salt is ensured; a is preferably 1, 2, 3 or 4; b is preferably 4, 5 or 6; c preferably has the value 0. Examples of suitable water-soluble metal cyanide salts are potassium hexacyanocobaltate(III), potassium hexacyanoferrate(II), potassium hexacyanoferrate(III), calcium hexacyanocobaltate(III) and lithium hexacyanocobaltate (III).

Preferred double metal cyanide compounds a), which are present in the catalysts according to the invention, are compounds of the general formula (III)

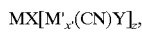

in which M is defined as in the formula (I) and
M' as in the formula (II), and
x, x', y and z are integers and selected such that electron-neutrality of the double metal cyanide compound is ensured.
Preferably
x=3, x'=1, y=6 and z 2,
M=Zn(II), Fe(II), Co(II) or Ni(II) and
M'=Co(III), Fe(III), Cr(III) or Ir(III).

Examples of suitable double metal cyanide compounds a) are zinc hexacyanocobaltate(III), zinc hexacyanoiridate(III), zinc hexacyanoferrate(III) and cobalt(II) hexacyanocobaltate(III). Further examples of suitable double metal cyanide compounds may be found, for example, in U.S. Pat. No. 5,158,922. Zinc hexacyanocobaltate(III) is particularly preferably used.

The organic complex ligands b) present in the DMC catalysts according to the invention are known in principle and have been exhaustively described in the prior art (for example in U.S. Pat. Nos. 5,158,922, 3,404,109, 3,829,505, 3,941,849, EP-A 700 949, EP-A 761 708, JP-A 4 145 123, U.S. Pat. No. 5,470,813, EP-A 743 093 and WO 97/40086). Preferred organic complex ligands are water-soluble, organic compounds having heteroatoms, such as oxygen, nitrogen, phosphorus or sulfur, which may form complexes with the double metal cyanide compound a). Suitable organic complex ligands are, for example, alcohols, aldehydes, ketones, ethers, esters, amides, ureas, nitriles, sulfides and mixtures thereof. Preferred organic complex ligands are water-soluble aliphatic alcohols, such as ethanol, isopropanol, n-butanol, isobutanol, sec.-butanol and tert.-butanol. tert.-Butanol is particularly preferred.

The organic complex ligand is added either during preparation of the catalyst or immediately after precipitation of the double metal cyanide compound a). The organic complex ligand is normally used in excess.

The DMC catalysts according to the invention contain the double metal cyanide compounds a) in quantities of 20 to 90 wt. %, preferably of 25 to 80 wt. %, relative to the quantity of the finished catalyst, and the organic complex ligands b) in quantities of 0.5 to 30 wt. %, preferably of I to 25 wt. %, relative to the quantity of the finished catalyst. The DMC catalysts according to the invention conventionally contain 1 to 80 wt. %, preferably 1 to 40 wt. %, relative to the quantity of the finished catalyst, of a mixture of two or more complex-forming components c).

Complex-forming components c) suitable for the production of the catalysts according to the invention are the above-stated functionalised polymers, glycidyl ethers, glycosides, carboxylic acid esters of polyhydric alcohols, bile acids or the salts, esters or amides thereof, cyclodextrins, phosphorus compounds, α,β-unsaturated carboxylic acid esters or ionic surface- or interface-active compounds.

Functionalised polymers suitable for the production of the catalysts according to the invention are known in principle and are exhaustively described in EP-A 700 949, WO 97/40086, WO 98/16310 and German patent applications 197 45 120.9, 197 57 574.9, 198 10 269.0, 198 34 573.9 and 198 42 382.9. Suitable functionalised polymers are, for example, polyethers, polyesters, polycarbonates, polyalkylene glycol sorbitan esters, polyalkylene, glycol glycidyl ethers, polyacrylamide, poly(acrylamide-co-acrylic acid), polyacrylic acid, poly(acrylic acid-co-maleic acid), polyacrylonitrile, polyalkyl acrylates, polyalkyl methacrylates, polyvinyl methyl ether, polyvinyl ethyl ether, polyvinyl acetate, polyvinyl alcohol, poly-N-vinylpyrrolidone, poly(N-vinylpyrrolidone-co-acrylic acid), polyvinyl methyl ketone, poly(4-vinylphenol), poly(acrylic acid-co-styrene), oxazoline polymers, polyalkyleneimines, maleic acid and maleic anhydride copolymers, hydroxyethylcellulose and polyacetals.

Functionalised polymers preferably used are polyethers, polyesters, polycarbonates, polyalkylene glycol sorbitan esters and polyalkylene glycol glycidyl ethers.

Polyethers preferably used are polyether polyols having hydroxy functionalities of 1 to 8, particularly preferably of 1 to 3, and number average molecular weights of between 150 and $10^7$, particularly preferably between 200 and $5 \cdot 10^4$. They are generally obtained by ring-opening polymerisation of epoxides in the presence of suitable starter compounds comprising active hydrogen atoms with basic, acidic or coordinative catalysis (for example DMC catalysis). Suitable polyether polyols are, for example, poly(oxypropylene) polyols, poly(oxyethylene) polyols, EO-tipped poly(oxypropylene) polyols, mixed EO/PO polyols, butylene oxide polymers, butylene oxide copolymers with ethylene oxide and/or propylene oxide and poly(oxytetramethylene) glycols.

Polyesters preferably used are linear and partially branched polyesters comprising hydroxy end groups and having average molar masses of below 10000, which are described in greater detail in German patent application 197 45 120.9. Particularly preferably used polyesters are those having average molar masses of 400 to 6000 and OH values of 28 to 300 mg of KOH/g which are suitable for the production of polyurethanes. Suitable polyesters arc, for example, poly(ethylene glycol adipate), poly(diethylene glycol adipate), poly(dipropylene glycol adipate), trimethylolpropane-branched poly(diethylene glycol adipate) or poly(tetramethylene glycol adipate).

Polycarbonates preferably used are aliphatic polycarbonates comprising hydroxy end groups and having average molar masses of below 12000, which are described in greater detail in German patent application 197 57 574.9. Aliphatic polycarbonate diols having average molar masses of 400 to 6000 are particularly preferably used. Suitable polycarbonate diols are, for example, poly(1,6-hexanediol) carbonate poly(diethylene glycol) carbonate, poly (dipropylene glycol) carbonate, poly(triethylene glycol) carbonate, poly(1,4-bishydroxymethylcyclohexane) carbonate, poly(1,4-butanediol) carbonate or poly (tripropylene glycol) carbonate.

Polyalkylene glycol sorbitan esters preferably used are polyethylene glycol sorbitan esters (polysorbates), which are described in greater detail in German patent application 198 42 382.9. Polyethylene glycol sorbitan mono-, di- and triesters of fatty acids with 6 to 18 C atoms and 2 to 40 mol of ethylene oxide are particularly preferred.

Polyalkylene glycol glycidyl ethers preferably used are mono- and diglycidyl ethers of polypropylene glycol and polyethylene glycol, which are described in greater detail in German patent application 198 34 573.9.

Glycidyl ethers of monomeric or polymeric (comprising at least two monomer units) aliphatic, aromatic or araliphatic mono-, di-, tri-, tetra- or polyfunctional alcohols are furthermore preferably suitable for the production of the catalysts according to the invention (component c)).

Preferred glycidyl ethers are those of mono-, di-, tri-, tetra- or polyfunctional aliphatic alcohols such as butanol, hexanol, octanol, decanol, dodecanol, tetradecanol, ethanediol, 1,2-propanediol, 1,3-propanediol, 1,4butandediol, 2,2-dimethyl-1,3-propanediol, 1,2,3-propanetriol, 1,6-hexanediol, 1,1,1-tris(hydroxyrnethyl)ethane, 1,1,1-tris(hydroxymethyl)propane, tetrakis (hydroxymethyl)methane, sorbitol, polyethylene glycol and polypropylene glycol, wherein both not only mono-, di-, tri-, tetra-, but also polyethers may be considered.

Mono- or diglycidyl ethers of butanol, hexanol, octanol, decanol, dodecanol, tetra-decanol, ethanediol or 1,4-butanediol as well as polypropylene glycol or polyethylene glycol, in particular having degrees of polymerisation of 2 to 1000 monomer units, are particularly preferably used.

The glycidyl ethers are generally obtained by reacting mono-, di-, tri-, tetra- or polyfunctional alcohols with epichlorohydrin in the presence of a Lewis acid, such as for example tin tetrachloride or boron trifluoride to yield the corresponding chlorohydrins and subsequent dehydrohalogenation with a base (for example sodium hydroxide).

Methods for the production of glycidyl ethers are generally well known and are exhaustively described, for example, in *Kirk-Othmer, Encyclopedia of Chemical Technology*, volume 9, 4$^{th}$ edition, 1994, pages 739 et seq. and *Ullmann, Encyclopedia of Industrial Chemistry*, volume A9, 5$^{th}$ edition, Weinheim, New York, 1987, page 552.

The glycidyl ethers used for the production of the catalyst according to the invention may be present in the finished catalyst in the form as originally introduced or also in a chemically modified, for example hydrolysed, form.

Suitable glycosides for component c) arc compounds synthesised from carbohydrates (sugars) and non-sugars (aglycons), in which the aglycon is attached by an oxygen atom via a glycoside bond with a hemiacetal C atom of the carbohydrate to give the acetal.

Suitable sugar components comprise monosaccharides such as glucose, galactose, mannose, fructose, arabinose, xylose or ribose, disaccharides, such as sucrose or maltose and oligo- or polysaccharides such as starch.

Non-sugar components which may be considered are $C_1$–$C_{30}$ hydrocarbon residues such as aryl, aralkyl and alkyl residues, preferably aralkyl and alkyl residues, particularly preferably alkyl residues having 1 to 30 C atoms.

Glycosides preferably used are the so-called alkylpolyglycosides, which are generally obtained by reacting carbohydrates with alcohols such as methanol, ethanol, propanol and butanol or by transacetylation of short-chain alkylglycosides with fatty alcohols having 8 to 20 C atoms in the presence of acids.

Particularly preferred alkylpolyglycosides are those having glucose as the repeat unit in the chain, with alkyl chain lengths of $C_8$ to $C_{16}$ and average degrees of polymerisation of between 1 and 2.

Methods for the production of glycosides are generally well known and are exhaustively described, for example, in *Kirk*-Othmer, Encyclopedia of Chemical Technology, volume 4, 4$^{th}$ edition, 1992, pages 916 et seq.; *Römpp, Lexikon Chemie*, volume 2, 10$^{th}$ edition, Stuttgart/New York, 1996, pages 1581 et seq.; *Angewandie Chemie*, 110, pages 1394–1412 (1998).

Suitable carboxylic acid esters of polyhydric alcohols are, for example, esters of $C_2$–$_{C30}$ carboxylic acids with aliphatic or alicyclic alcohols having two or more hydroxyl groups per molecule, such as ethylene glycol, 1,2-propanediol, 1,3-propanediol, diethylene glycol, triethylene glycol, 1,2,3-propanetriol (glycerol), 1,3-butanediol, 1,4-butanediol, butanetriol, 1,6-hexanediol, 1,1,1-trimethylolethane, 1,1,1-trimethylolpropane, pentaerythritol, carbohydrates (sugars) or sugar alcohols such as sorbitol or sorbitan. Suitable sugars are monosaccharides such as glucose, galactose, mannose, fructose, arabinose, xylose or ribose, disaccharides such as sucrose or maltose and oligo- or polysaccharides such as starch.

Carboxylic acid components which may, for example, be considered are $C_2$–$C_{30}$ carboxylic acids such as aryl-, aralkyl- and alkylcarboxylic acids, preferably aralkyl- and alkylcarboxylic acids, particularly preferably alkylcarboxylic acids such as acetic acid, butyric acid, isovaleric acid, caproic acid, caprylic acid, capric acid, lauric acid, myristic acid, palmitic acid, stearic acid, oleic acid, linoleic acid or linolenic acid.

Preferably used carboxylic acid esters of polyhydric alcohols are esters of 1,2,3-propanetriol (glycerol), 1,1,1-trimethylolpropane, pentaerythritol, maltose or sorbitan with $C_2$–$C_{18}$ alkylcarboxylic acids.

Particularly preferred carboxylic acid esters of polyhydric alcohols are mono-, di-, tri- or tetraesters of 1,2,3-propanetriol (glycerol), pentaerlythritol or sorbitan with $C_2$–$C_{18}$ alkylcarboxylic acids.

Methods for the production of carboxylic acid esters of polyhydric alcohols or the isolation thereof from fats are generally well known and are exhaustively described, for example, in *Kirk-Othmer, Encyclopedia of Chemical Technology*, volume 9, 3$^{rd}$ edition, 1980, pages 795 et seq.; *Römpp, Lexikon Chemie*, 8$^{th}$ edition, Stuttgart, New York, 1981; *Ullmann's Encyclopedia of Industrial Chemistry*, volume A10, 5$^{th}$ edition, 1987, pages 173–218.

Bile acids suitable for component c) are $C_{24}$ steroid carboxylic acids, which are degradation products of cholesterol, and which are generally derived from 5β-cholan-24-oic acid by introducing hydroxy groups in a position at C-3, C-6, C-7 and C-12.

Preferred bile acids are of the general formula

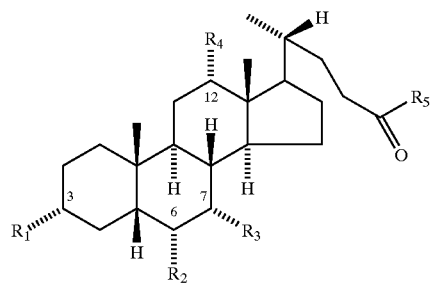

wherein $R_1$, $R_2$, $R_3$ and $R_4$ independently represent H or OH and $R_5$ represents OH, NH—$CH_2$-COOH, NH—$CH_2$—$CH_2$—$SO_3$H, NH—$(CH_2)_3$—N$(CH_3)_2$—$CH_2$—CHOH—$CH_2$—$SO_3^-$ or NH—$(CH_2)_3$—N$^+$$(CH_3)_2$—$(CH_2)_3$—$SO_3^-$.

The free acids or the salts thereof are suitable, preferably alkali metal or alkaline earth metal salts, as well as the esters thereof, preferably having alkyl residues with 1 to 30 C atoms and the amides thereof, preferably having alkyl residues or sulfoalkyl, sulfoalkylaminoalkyl, sulfohydroxyalkylaminoalkyl and carboxyalkyl residues in acid or salt form.

Examples of suitable bile acids or the salts, esters or amides thereof are cholic acid ($3\alpha,7\alpha,12\alpha$-trihydroxy-$5\beta$-cholan-24-oic acid; $R_1=R_3=R_4=R_5=OH$, $R_2=H$), cholic acid sodium salt (sodium cholate), lithium cholate, potassium cholate, glycocholic acid ($3\alpha,7\alpha,12\alpha$-trihydroxy-$5\beta$-cholan-24-oic acid N-[carboxymethyl]-amide; $R_1=R_3=R=OH$, $R_2=H$, $NH-CH_2-COOH$), sodium glycocholate, taurocholic acid ($3\alpha,7\alpha,12\alpha$-trihydroxy-$5\beta$-cholan-24-oic acid N-[2-sulfoethyl]-amide; $R_1=R_3=R_4=OH$, $R_2=H$, $R_5=NH-CH_2-CH_2-SO_3H$), sodium taurocholate, deoxycholic acid ($3\alpha,12\alpha$-dihydroxy-$5\beta$-cholan-24-oic acid; $R_1=R_4=R_5=OH$, $R_2=R_3=H$), sodium deoxycholate, potassium deoxycholate, lithium deoxycholate, glyeodeoxycholic acid ($3\alpha,12\alpha$-dihydroxy-$5\beta$-cholan-24-oic acid N-[carboxymethyl]amide; $R_1=R_4=OH$, $R_2=R_3=H$, $R_5=NH-CH_2-COOH$), sodium glycodeoxycholate, taurodeoxycholic acid ($3\alpha,12\alpha$-dihydroxy-$5\beta$-cholan-24oic acid N-[2-sulfoethyl]amide; $R_1=R_4=OH$, $R_2=R_3=H$, $R_5=NH-CH_2CH_2-SO_3H$), sodium taurodeoxycholate, chenodeoxycholic acid ($3\alpha,7\alpha$-dihydroxy-$5\beta$-cholan-24-oic acid; $R_1=R_3=R_5=OH$, $R_2=R_4=H$), sodium chenodeoxycholate, glycochenodeoxycholic acid ($3\alpha,7\alpha$-dihydroxy-$5\beta$-cholan-24-oic acid N-[carboxymethyl]amide; $R_1=R_3=OH$, $R_2=R_4=H$, $R_5=NH-CH_2-COOH$), sodium glycochenodeoxycholate, taurochenodeoxycholic acid ($3\alpha,7\alpha$-dihydroxy-$5\beta$-cholan-24-oic acid N-[sulfoethyl]amide; $R_1=R_3=OH$, $R_2=R_4=H$, $R_5=NH-CH_2-CH_2-SO_3H$), sodium taurochenodeoxycholate, lithocholic acid ($3\alpha$-hydroxy-$5\beta$-cholan-24-oic acid; $R_1=R_5=OH$, $R_2=R_3=R_4=H$), sodium lithocholate, potassium lithocholate, hyocholic acid ($3\alpha,6\alpha,7\alpha$-trihydroxy-$5\beta$-cholan-24-oic acid; $R_1=R_3=R_3=R_5=OH$, $R_4=H$), sodium hyocholate, lithium hyocholate, potassium hyocholate, hyodeoxycholic acid ($3\alpha,6\alpha$-dihydroxy-$5\beta$-cholan-24-oic acid; $R_1=R_2=R_5=OH$; $R_3=R_4=H$), sodium hyodeoxycholate, lithium hyodeoxycholate, potassium hyodeoxycholate, cholic acid methyl ester, cholic acid ethyl ester, deoxycholic acid ethyl ester and hyocholic acid methyl ester.

The sodium, lithium or potassium salts or the methyl or ethyl esters of cholic acid, glycocholic acid, taurocholic acid, deoxycholic acid, glycodeoxycholic acid, taurodeoxycholic acid, chenodeoxycholic acid, glycochenodeoxycholic acid, taurochenodeoxycholic acid, lithocholic acid, hyocholic acid, hyodeoxycholic acid or mixtures thereof are particularly preferably used.

Bile acids such as ursocholic acid ($3\alpha,7\beta,12\alpha$-trihydroxy-$5\beta$-cholan-24-oic acid), ursodeoxycholic acid ($3\alpha,7\beta$-dihydroxy-$5\beta$-cholan-24-oic acid), 7-oxolithocholic acid ($3\alpha$-hydroxy-7-oxo-$5\beta$-cholan-24-oic acid), lithocholic acid 3-sulfate ($3\alpha$-hydroxy-$5\beta$-holan-24-oic acid 3-sulfate), norcholic acid and bisnorcholic acid, or the salts, esters or amides thereof are also suitable.

The bile acids and the salts, esters or amides thereof are generally well known and are exhaustively described in *Nachr. Chem. Tech. Lab.* 43 (1995) 1047, Setchell et al.: *The Bile Acids*, volume 4, Plenum, New York 1998 and *Römpp, Lexikon Naturstoffe*, Stuttgart, New York 1997, pages 248 et seq.

Suitable cyclodextrins for component c) are, for example, unsubstituted cyclodextrins or the ester, alkyl ether, hydroxyalkyl ether, alkoxycarbonylalkyl ether and carboxyalkyl ether derivatives thereof or the salts thereof.

Cyclodextrins are cyclohexa-, cyclohepta- or cyclooctaamyloses having 6, 7 or 8 1,4-linked glucose units, which are formed during the degradation of starch by *Bacillus macerans* or *Bacillus circulans* under the action of cyclodextrin glycosyl transferase, such as for example $\alpha$-, $\beta$-, $\gamma$- or $\delta$-cyclodextrin.

Carboxylic acid components suitable for cyclodextrin esters are aryl-, aralkyl- and alkylcarboxylic acids having 2 to 30 C atoms, preferably 2 to 24 C atoms, particularly preferably 2 to 20 C atoms, preferably aralkyl- and alkylcarboxylic acids, particularly preferably alkylcarboxylic acids.

Linear or branched alkyl groups having 1 to 30 C atoms, preferably 1 to 24 C atoms, particularly preferably 1 to 20 C atoms may be considered as the alkyl component for cyclodextrin alkyl ethers, hydroxyalkyl ethers, alkoxycarbonylalkyl ethers and carboxyalkyl ethers.

Preferably used cyclodextrins are $\alpha$-, $\beta$-, and $\gamma$-cyclodextrins and the mono-, di- and triethers, mono-, di- and triesters or monoesters/diethers thereof, which are generally obtained by etheriling $\alpha$-, $\beta$-, and $\gamma$-cyclodextrins with alkylating agents, such as for example dimethyl sulfate or alkyl halides having 1 to 30 C atoms, such as for example methyl, ethyl, propyl, butyl, pentyl, hexyl, heptyl, octyl chloride, bromide or iodide and/or by esterification with acetic acid or succinic acid in the presence of acids.

Methyl-$\alpha$-cyclodextrin, methyl-$\beta$-cyclodextrin, methyl-$\gamma$-cyclodextrin, ethyl-$\beta$-cyclodextrin, butyl-$\alpha$-cyclodextrin, butyl-$\beta$-cyclodextrin, butyl-$\gamma$-cyclodextrin, 2,6-dimethyl-$\alpha$-cyclodextrin, 2,6-dimethyl-$\beta$-cyclodextrin, 2,6-dimethyl-$\gamma$-cyclodextrin, 2,6-diethyl-$\beta$-cyclodextrin, 2,6-dibutyl-$\beta$-cyclodextrin, 2,3,6-trimethyl-$\alpha$-cyclodextrin, 2,3,6-triethyl-$\beta$-cyclodextrin, 2,3,6-trimethyl-$\gamma$-cyclodextrin, 2,3,6-trioctyl-$\alpha$-cyclodextrin, 2,3,6-trioctyl-$\beta$-cyclodextrin, 2,3,6-triacetyl-$\alpha$-cyclodextrin, 2,3,6-triacetyl-$\beta$-cyclodextrin, 2,3,6-triacetyl-$\gamma$-cyclodextrin, (2-hydroxy)propyl-$\alpha$-cyclodextrin, (2-hydroxy)propyl-$\beta$-cyclodextrin, (2-hydroxy)propyl-$\gamma$-cyclodextrin, partially or completely acetylated and succinylated $\alpha$-, $\beta$- or $\gamma$-cyclodextrin, 2,6-dimethyl-3-acetyl-$\beta$-cyclodextrin or 2,6-dibutyl-3-acetyl-$\beta$-cyclodextrin.

Methods for the production of cyclodextrins are generally well known and are exhaustively described, for example, in *Römpp, Lexikon Chemie,* $10^{th}$ edition, Stuttgart/New York, 1997, pages 845 et seq. and *Chemical Reviews* 98 (1998) 1743.

Suitable phosphorus compounds for component c) of the catalyst according to the invention are organic phosphates, such as for example mono-, di- or triesters of phosphoric acid, mono-, di-, tri- or tetraesters of pyrophosphoric acid and mono-, di-, tri-, tetra- or polyesters of polyphosphoric acid and alcohols having 1 to 30 C atoms.

Suitable organic phosphites are mono-, di- or triesters of phosphorous acid and alcohols having 1 to 30 C atoms.

Suitable organic phosphonates for component c) are, for example, mono- or diesters of phosphonic acid, alkylphosphonic acids, arylphosphonic acids, alkoxycarbonylalkylphosphonic acids, alkoxycarbonylphosphonic acids, cyanoalkylphosphonic acids and cyanophosphonic acids or mono-, di-, tri- or tetraesters of alkyldiphosphonic acids and alcohols having 1 to 30 C atoms.

Further phosphonites suitable for component c) are diesters of phosphonous acid or arylphosphonous acid and alcohols having 1 to 30 C atoms.

Phosphinates suitable for the production of the catalysts according to the invention (component c)) are esters of phosphinic acid, alkylphosphinic acids, dialkylphosphinic acids or arylphosphinic acids and alcohols having 1 to 30 C atoms.

Phosphinites suitable for the production of the catalysts according to the invention (component c)) are esters of alkylphosphinous acid, dialkylphosphinous acid or arylphosphinous acid and alcohols having 1 to 30 C atoms.

Suitable alcohol components are mono- or polyhydric aryl, aralkyl, alkoxyalkyl and alkyl alcohols having 1 to 30 C atoms, preferably 1 to 24 C atoms, particularly preferably 1 to 20 C atoms, preferably aralkyl, alkoxyalkyl and alkyl alcohols, particularly preferably alkoxyalkyl and alkyl alcohols.

The organic phosphates, phosphites, phosphonates, phosphonites, phosphinates or phosphinites used for the production of the catalysts according to the invention are generally obtained by reacting phosphoric acid, pyrophosphoric acid, polyphosphoric acids, phosphonic acid, alkylphosphonic acids, arylphosphonic acids, alkoxycarbonylalkylphosphonic acids, alkoxycarbonylphosphonic acids, cyanoalkylphosphonic acids, cyanophosphonic acid, alkyldiphosphonic acids, phosphonous acid, phosphorous acid, phosphinic acid, phosphinous acid or the halogen derivatives or phosphorus oxides thereof with hydroxy compounds having 1 to 30 C atoms, such as methanol, ethanol, propanol, butanol, pentanol, hexanol, 2-ethylhexanol, heptanol, octanol, nonanol, decanol, dodecanol, tridecanol, tetradecanol, pentadecanol, hexadecanol, heptadecanol, octadecanol, nonadecanol, methoxymethanol, ethoxymethanol, propoxymethanol, butoxymethanol, 2-ethoxyethanol, 2-propoxyethanol, 2-butoxyethanol, phenol, hydroxyacetic acid ethyl ester, hydroxyacetic acid propyl ester, hydroxypropionic acid ethyl ester, hydroxypropionic acid propyl ester, 1,2-ethanediol, 1,2-propanediol, 1,2,3-trihydroxypropane, 1,1,1-trimethylolpropane or pentaerythritol.

Phosphoric acid triethyl ester, phosphoric acid tributyl ester, phosphoric acid trioctyl ester, phosphoric acid tris(2-ethylhexyl) ester, phosphoric acid tris(2-butoxyethyl) ester, butylphosphonic acid dibutyl ester, phenylphosphonic acid dioctyl ester, phosphonoformic acid triethyl ester, phosphonoacetic acid trimethyl ester, phosphonoacetic acid triethyl ester, 2-phosphonopropionic acid trimethyl ester, 2-phosphonopropionic acid triethyl ester, 2-phosphonopropionic acid tripropyl ester, 2-phosphonopropionic acid tributyl ester, 3-phosphonopropionic acid triethyl ester, tributyl phosphite, trilauryl phosphite, tris(3-ethyloxyethanyl-3-methyl) phosphite and heptakis(dipropylene glycol) phosphite.

Methods for the production of phosphoric acid, phosphorous acid, phosphonic acid, phosphonous acid, phosphinic acid and phosphinous acid esters are known and are exhaustively described, for example, in Kirk-Othmer *Encyclopedia of Chemical Technology,* volume 18, 4<sup>th</sup> edition, 1996, pages 737 et seq.; *Römpp, Lexikon Chemie,* volume 4, 10<sup>th</sup> edition, Stuttgart/New York, 1998, pages 3280 et seq.; *Ullmann's Encyclopedia of Industrial Chemistry,* volume A19, 5<sup>th</sup> edition, 1991, pages 545 et seq., *Houben-Weyl: Methoden der organischen Chemie,* volume XII/1 and XII/2, Stuttgart 1963/1964.

α,β-Unsaturated carboxylic acid esters suitable for the production of the catalysts according to the invention (component c)) are, for example, mono-, di-, tri- or polyesters of acrylic acid and alkyl-, alkoxy-, alkoxycarbonyl and alkoxycarbonylalkylacrylic acids with alcohols having 1 to 30 C atoms or polyether polyols.

Suitable alcohol components are mono-, di-, tri- or polyhydric aryl, aralkyl, alkoxyalkyl and alkyl alcohols having 1 to 30 C atoms, preferably 1 to 24 C atoms, particularly preferably 1 to 20 C atoms, preferably aralkyl, alkoxyalkyl and alkyl alcohols, particularly preferably alkoxyalkyl and alkyl alcohols.

Further suitable alcohol components are polyalkylene glycols and polyalkylene glycol ethers, preferably polypropylene glycols and polyethylene glycols or the ethers thereof having molecular weights of 200 to 10000, preferably of 300 to 9000, particularly preferably of 400 to 8000.

α,β-Unsaturated carboxylic acids which may be considered are acrylic acid and alkyl-, alkoxy- and alkoxycarbonylalkylacrylic acids having 1 to 20 C atoms, such as 2-methylacrylic acid (methacrylic acid), 3-methylacrylic acid (crotonic acid), trans-2,3-dimethylacrylic acid (tiglic acid), 3,3-dimethylacrylic acid (senecioic acid) or 3-methoxyacrylic acid, preferably acrylic acid, 2-methylacrylic acid, 3-methylacrylic acid and 3-methoxyacrylic acid, particularly preferably acrylic acid and 2-methylacrylic acid.

The α,β-unsaturated carboxylic acid esters used for the production of the catalysts according to the invention are generally obtained by esterifying mono-, di-, tri-, tetra- or polyhydroxy compounds having 1 to 30 C atoms, such as methanol, ethanol, ethanediol (ethylene glycol), 1-propanol, 2-propanol, 1,2-propanediol, 1,3-propanediol, 1,2,3-propanetriol (glycerol), butanol, 2-butanol, 1-butanol, 1,2-butanediol, 1,3-butanediol, 2,3-butanediol, 1,4butanediol, 1,2,3-butanetriol, 1-pentanol, 1-hexanol, 1-heptanol, 1-octanol, 1-nonanol, 1-decanol, 1-dodecanol, 1-tridecanol, 1-tetradecarol, 1-hexadecanol, 1-heptadecanol, 9-octadecanol, 1,1,1-tris(hydroxymethyl)propane, pentaerythritol, methoxymethanol, ethoxymethanol, propoxymethanol, butoxymethanol, 2-ethoxyethanol, 2-propoxyethanol, 2-butoxyethanol, hydroxyacetic acid methyl ester, hydroxyacetic acid ethyl ester, hydroxyacetic acid propyl ester, hydroxypropionic acid methyl ester, hydroxypropionic acid ethyl ester, hydroxypropionic acid propyl ester or polyether polyols such as polyethylene glycols and polypropylene glycols with the appropriate α,β-unsaturated carboxylic acids, optionally in the presence of catalysts.

Mono-, di- and triesters of acrylic and methacrylic acid with ethanediol, 1,2-propanediol, 1,3-propanediol, 1,4butanediol, 1,6-hexanediol, 1,2,3-propanetriol, 1,1,1-tris(hydroxymethyl)propane, 1,1,1-tris(hydroxymethyl) propane ethoxylates, 1,1,1-tris(hydroxymethyl)propane propoxylates, polyethylene glycols and polypropylene glycols are preferred.

Particularly preferred α,β-unsaturated carboxylic acid esters are polyethylene glycol acrylic acid ester, polyethylene glycol diacrylic acid ester, polyethylene glycol methacrylic acid ester, polyethylene glycol dimethacrylic acid ester, polypropylene glycol acrylic acid ester, polypropylene glycol diacrylic acid ester, polypropylene glycol methacrylic acid ester, polypropylene glycol dimethacrylic acid ester, 1,2,3-propanetriol diacrylic acid ester, 1,2,3-propanetriol dimethacrylic acid ester, 1,2,3-propanetriol triacrylic acid ester, 1,2,3-propanetriol- 1,3-(2-hydroxypropoxylate) diacrylic acid ester, 1,2,3-propanetriolpropoxylate triacrylic acid ester, 1,4-butanediol acrylic acid ester, 1,4-butanediol dimethacrylic acid ester, 1,6-hexanediol diacrylic acid ester, 2-hydroxypropyl methacrylic acid ester, 1,1,1-tris(hydroxymethyl)propane triacrylic acid ester, 1,1,1-tris(hydroxymethyl)propane ethoxylate triacrylic acid ester, 1,1,1-tris(hydroxymethyl)propane ethoxylate trimethacrylic acid ester, 1,1,1-tris(hydroxymethyl)propane propoxylate triacrylic acid ester or 1,1,1-tris(hydroxymethyl)propane propoxylate trimethacrylic acid ester.

Methods for the production of α,β-unsaturated carboxylic acid esters are generally well known and are exhaustively described, for example, in *Kirk*-Othmer: Encyclopedia of Chemical Technology, volume 18, 4$^{th}$ edition, 1996, pages 737 et seq.; *Römpp, Lexikon Chemie,* volume 4, 10$^{th}$ edition, Stuttgart, New York, 1998, pages 3286 et seq.; *Ullmann's Encyclopedia of Industrial Chemistry,* volume A19, 5$^{th}$ edition, 1991, pages 545 et seq., *Houben-Weyl: Methoden der organischen Chemie,* volume XII/1 and XII/2, Stuttgart 1963/1964.

The structural feature of the ionic surface- or interface-active compounds suitable for the production of the catalysts according to the invention is the amphiphilic molecular structure thereof, i.e. they contain at least one hydrophilic ionic group (or a hydrophilic, ionic moiety) and at least one hydrophobic group (or a hydrophobic moiety). Examples of such ionic surface- or interface-active compounds may be found in the group of surfactants, soaps, emulsifiers, detergents and dispersants.

The hydrophilic ionic groups may be of an anionic, cationic or zwitterionic (amphoteric) nature. Examples of anionic groups are carboxylate, sulfonate, sulfate, thiosulfate, phosphonate, phosphinate, phosphate or dithiophosphate groups. Examples of cationic groups are ammonium, phosphonium or sulfonium groups. Examples of zwitterionic groups are betaine, sulfobetaine or amine oxide groups.

The hydrophobic groups are preferably $C_2$–$C_{50}$, hydrocarbon residues, such as aryl, aralkyl and alkyl residues. Fluoroalkyl, silaalkyl, thiaalkyl or oxaalkyl groups are, however, also suitable.

Examples of suitable classes of compounds having hydrophilic anionic groups are carboxylates such as alkyl carboxylates (soaps), ether carboxylates (carboxymethylated ethoxylates), polycarboxylates such as malonates and succinates, bile acid salts, for example bile acid amides having sulfoalkyl and carboxyalkyl residues in the salt form, amino acid derivatives such as sarcosides (alkanuylsarcosinates), sulfonamidocarboxylates, sulfates such as alkyl sulfates, ether sulfates, for example fatty alcohol ether sulfates, aryl ether sulfates or amido ether sulfates, sulfated carboxylates, sulfated carboxylic acid glycerides, sulfated carboxylic acid esters, sulfated carboxylic acid amides, sulfonates, for example alkyl, aryl and alkylaryl sulfonates, sulfonated carboxylates, sulfonated carboxylic acid esters, sulfonated carboxylic acid amides, carboxyl ester sulfonates, such as α-sulfofatty acid esters, carboxyamide sulfonates, sulfosuccinic acid esters, ether sulfonates, thiosulfates, phosphates, for example alkyl phosphates or glycerol phosphates, phosphonates, phosphinates and dithiophosphates.

Examples of suitable classes of compounds having hydrophilic cationic groups are primary, secondary, tertiary and quaternary ammonium salts having alkyl, aryl and aralkyl residues, alkoxylated ammonium salts, quaternary ammonium esters, benzylammonium salts, alkanolammonium salts, pyridinium salts, imidazolinium salts, oxazolinium salts, thiazolinium salts, salts of amine oxides, sulfonium salts, quinolinium salts, isoquinolinium salts and tropylium salts.

Examples of suitable classes of compounds having a hydrophilic zwitterionic (amphoteric) group are amine oxides, imidazolinium derivatives, such as imidazolinium carboxylates, betaines, for example alkyl- and amidopropylbetaines, sulfobetaines, aminocarboxylic acids and phospholipids, for example phosphatidylcholine (lecithin).

The ionic surface- or interface-active compounds may, of course, also contain two or more hydrophilic (anionic and/or cationic and/or zwitterionic) groups or moieties.

Methods for the production of the ionic surface- or interface-active compounds suitable for the production of the catalysts according to the invention are generally well known and are exhaustively described, for example, in *Ullmann's Encyclopedia of Industrial Chemistry,* 5$^{th}$ edition, volume A25, pages 747–817, VCH, Weinheim, 1994, *Kirk-Othmer, Encyclopedia of Chemical Technology,* 4$^{th}$ edition, volume 23, pages 477–541, John Wiley & Sons, New York, 1997, *Tensid-Taschenbuch,* 2$^{nd}$ edition, H. Stache (ed.), Carl Hanser Verlag, Munich, 1982, *Surfactant Science Series,* volume 1–74, M. J. Schick (Consulting Editor), Marcel Decker, New York, 1967–1998, *Methods in Enzymology,* volume 182, M. P. Deutscher (ed.), pages 239–253, Academic Press, San Diego, 1990.

Catalyst composition is conventionally analysed by elemental analysis, thermogravimetry or extractive removal of the complex-forming components with subsequent gravimetric determination.

The catalysts according to the invention may be crystalline, partially crystalline or amorphous. Crystallinity is conventionally analysed by powder X-ray diffractometry.

Particularly preferred catalysts according to the invention are those containing
  a) zinc hexacyanocobaltate(III),
  b) tert.-butanol and
  c) two or more complex-forming components of the above-stated type.

The DMC catalysts according to the invention are conventionally produced in an aqueous solution by reacting metal salts, in particular of the formula (I), with metal cyanide salts, in particular of the formula (II), in the presence of organic complex ligands b), which are neither functionalised polymers, glycidyl ethers, glycosides, carboxylic acid esters of polyhydric alcohols, bile acids or the salts, esters or amides thereof, cyclodextrins, phosphorus compounds, α,β-unsaturated carboxylic acid esters nor ionic surface- or interface-active compounds, and two or more complex-forming components c).

In this process, the aqueous solutions of the metal salt (for example zinc chloride used in stoichiometric excess (at least 50 mol % relative to the metal cyanide salt)) and of the metal cyanide salt (for example potassium hexacyanocobaltate) are preferably first reacted in presence of the organic complex ligand b) (for example tert.-butanol), wherein a suspension forms which contains the double metal cyanide compound a) (for example zinc hexacyanocobaltate), water d), excess metal salt e), and the organic complex ligand b).

The organic complex ligand b) may here be present in the aqueous solution of the metal salt and/or of the metal cyanide salt, or it is added directly to the suspension obtained after precipitation of the double metal cyanide compound a). It has proved advantageous to mix the aqueous solutions and the organic complex ligand b) with vigorous stirring. The resulting suspension is then conventionally treated with a mixture of two or more complex-forming components c). The mixture of two or more complex-forming components c) is here preferably used as a mixture with water and the organic complex ligand b).

The catalyst is then isolated from the suspension using known methods, such as centrifugation or filtration. In a preferred variant embodiment, the isolated catalyst is then washed with an aqueous solution of the organic complex ligand b) (for example by being resuspended and then isolated again by filtration or centrifugation). In this manner, it is possible to remove, for example, water-soluble secondary products, such as potassium chloride, from the catalyst according to the invention.

The quantity of the organic complex ligand b) in the aqueous washing solution is preferably between 40 and 80 wt. %, relative to the entire solution. It is furthermore advantageous to add to the aqueous washing solution a small quantity, preferably 0.5 to 5 wt. %, relative to the entire solution, of the mixture of two or more complex-forming components c).

It is moreover advantageous to wash the catalyst more than once. The first washing operation may, for example, be repeated for this purpose. It is, however, preferred to use non-aqueous solutions for further washing operations, for example a mixture of the organic complex ligand and the mixture of two or more complex-forming components c).

The washed catalyst, optionally after being pulverised, is then dried at temperatures of in general 20 to 100° C. and at pressures of in general 0.1 mbar to standard pressure (1013 mbar).

The present invention furthermore provides the use of the DMC catalysts according to the invention in a process for the production of polyether polyols by polyaddition of alkylene oxides onto starter compounds comprising active hydrogen atoms.

Preferably used alkylene oxides are ethylene oxide, propylene oxide, butylene oxide and mixtures thereof. Synthesis of the polyether chains by alkoxylation may be performed, for example, with only one monomeric epoxide or may also proceed randomly or in blocks with 2 or 3 different monomeric epoxides. Further details may be found in *Ullmanns Encyclopädie der industriellen Chemie*, volume A21, 1992, pages 670 et seq.

Starter compounds comprising active hydrogen atoms are preferably compounds having (number average) molecular weights of 18 to 2000 and 1 to 8 hydroxyl groups. The following may be mentioned by way of example: ethylene glycol, diethylene glycol, triethylene glycol, 1,2-propylene glycol, 1,4-butanediol, hexamethylene glycol, bisphenol A, trimethylolpropane, glycerol, pentaerythritol, sorbitol, cane sugar, degraded starch or water.

Starter compounds comprising active hydrogen atoms which are used are advantageously those which have been produced, for example, by conventional alkali metal catalysis from the above-stated low molecular weight starter compounds and comprise oligomeric alkoxylation product having (number average) molecular weights of 200 to 2000.

The polyaddition of alkylene oxides onto starter compounds comprising active hydrogen atoms catalysed by the catalysts according to the invention generally proceeds at temperatures of 20 to 200° C., preferably in the range from 40 to 180° C., particularly preferably at temperatures of 50 to 150° C. The reaction may be performed at total pressures of 0.0001 to 20 bar. Polyaddition may be performed without solvents or in an inert, organic solvent, such as toluene and/or THF. The quantity of solvent is conventionally 10 to 30 wt. %, relative to the quantity of polyether polyol to be produced.

Catalyst concentration is selected such that, under the stated reaction conditions, the polyaddition reaction may be maintained under good control. The catalyst concentration is generally in the range from 0.0005 wt. % to 1 wt. %, preferably in the range from 0.001 wt. % to 0.1 wt. %, particularly preferably in the range. from 0.001 to 0.0025 wt. %, relative to the quantity of polyether polyol to be produced.

The (number average) molecular weights of the polyether polyols produced using the process according to the invention are in the range from 500 to 100000 g/mol, preferably in the range from 1000 to 50000 g/mol, particularly preferably in the range from 2000 to 20000 g/mol.

Polyaddition may be performed continuously or discontinuously, for example in a batch or semi-batch process.

By virtue of their distinctly increased activity, the catalysts according to the invention may be used in very low concentrations (25 ppm and below, relative to the quantity of polyether polyol to be produced). If the polyether polyols produced in the presence of the catalysts according to the invention are used in the production of polyurethanes (*Kunststoffhandbuch*, volume 7, *Polyurethane*, $3^{rd}$ edition 1993, pp. 25–32 and 57–67), it is possible to dispense with removing the catalyst from the polyether polyol, without having any negative impact on the product qualities of the polyurethane so obtained.

EXAMPLES

Catalyst Preparation

Example A

Production of a DMC catalyst with glycerol tricaproate and 2-phosphonopropionic acid triethyl ester (catalyst A).

A solution of 12.5 g (91.5 mmol) of zinc chloride in 20 ml of distilled water is added with vigorous stirring (24000 rpm) to a solution of 4 g (12 mmol) of potassium hexacyanocobaltate in 70 ml of distilled water. Immediately thereafter, a mixture of 50 g of tert.-butanol and 50 g of distilled water is added to the resulting suspension and then stirred vigorously for 10 minutes (24000 rpm). A mixture of 0.5 g of glycerol tricaproate and 0.5 g of 2-phosphonopropionic acid triethyl ester, 1 g of tert.-butanol and 100 g of distilled water is then added and stirred for 3 minutes (1000 rpm). The solid is isolated by filtration, then stirred (10000 rpm) for 10 minutes with a mixture of 70 g of tert.-butanol, 30 g of distilled water, 0.5 g of glycerol tricaproate and 0.5 g of 2-phosphonopropionic acid triethyl ester and refiltered. Finally, the product is stirred once more (10000 rpm) for 10 minutes with a mixture of 100 g of tert.-butanol, 0.5 g of glycerol tricaproate and 0.5 g of 2-phosphonopropionic acid triethyl ester. After filtration, the catalyst is dried to constant weight at 50° C. and standard pressure.

Yield of dried, pulverulent catalyst: 5.8 g Elemental analysis, thermogravimetric analysis and extraction: Cobalt=9.8 wt. %, zinc=23.2 wt. %, tert.-butanol=3.0 wt. %, glycerol tricaproate=11.4 wt. %, 2-phosphonopropionic acid triethyl ester=16.9 wt. %.

Example B

Production of a DMC catalyst with a polypropylene glycol diglycidyl ether and 2-phosphonopropionic acid triethyl ester (catalyst B)

The same method was used as in Example A, except that a polypropylene glycol diglycidyl ether with an average molar mass of 640 and 2-phosphonopropionic acid triethyl ester were used instead of glycerol tricaproate and 2-phosphonopropionic acid triethyl ester.

Yield of dried, pulverulent catalyst: 6.8 g Elemental analysis, thermogravimetric analysis and extraction: Cobalt=10.3 wt. %, zinc=23.4 wt. %, tert.-butanol=1.3 wt. %, polypropylene glycol diglycidyl ether=20.5 wt. %, 2-phosphonopropionic acid triethyl ester=8.5 wt. %.

Example C

Production of a DMC catalyst with a polyester and cholic acid sodium salt (catalyst C).

The same method was used as in Example A, except that a polyester prepared from adipic acid and diethylene glycol and slightly branched by trimethylolpropane having an average molar mass of 2300 (OH value=50 mg of KOH/g) and cholic acid sodium salt were used instead of glycerol tricaproate and 2-phosphonopropionic acid triethyl ester.

Yield of dried, pulverulent catalyst: 4.8 g Elemental analysis, thermogravimetric analysis and extraction: Cobalt=12.7 wt. %, zinc=25.2 wt. %, tert.-butanol=4.2 wt. %, polyester 12.8 wt. %, cholic acid sodium salt=3.7 wt. %.

Example D (Comparison)

Production of a DMC catalyst with glycerol tricaproate without 2-phosphonopropionic acid triethyl ester (catalyst D)

A solution of 12.5 g (91.5 mmol) of zinc chloride in 20 ml of distilled water is added with vigorous stirring (24000 rpm) to a solution of 4 g (12 mmol) of potassium hexacyanocobaltate in 75 ml of distilled water. Immediately thereafter, a mixture of 50 g of tert.-butanol and 50 g of distilled water is added to the resulting suspension and then stirred vigorously for 10 minutes (24000 rpm). A mixture of 1 g of a glycerol tricaproate (Aldrich), 1 g of tert.-butanol and 100 g of distilled water is then added and stirred for 3 minutes (10000 rpm). The solid is isolated by filtration, then stirred for 10 minutes with a mixture of 70 g of tert.-butanol, 30 g of distilled water and 1 g of the above glycerol tricaproate and refiltered. Finally, the product is stirred once more (10000 rpm) for 10 minutes with a mixture of 100 g of tert.-butanol and 0.5 g of the above glycerol tricaproate. After filtration, the catalyst is dried to constant weight at 50° C. and standard pressure.

Yield of dried, pulverulent catalyst: 5.3 g Elemental analysis, thermogravimetric analysis and extraction: Cobalt=12.3 wt. %, zinc=27.0 wt. %, tert.-butanol 7.2 wt. %, glycerol tricaproate=3.7 wt. %.

Example E (Comparison)

Production of a DMC catalyst with 2-phosphonopropionic acid triethyl ester without glycerol tricaproate (catalyst E)

The same method was used as in Example D (comparison), except that 2-phosphonopropionic acid triethyl ester (Fluka) was used instead of the glycerol tricaproate from Example D.

Yield of dried, pulverulent catalyst: 5.9 g Elemental analysis, thermogravimetric analysis and extraction: Cobalt=10.2 wt. %, zinc=23.5 wt. %, tert.-butanol=2.3 wt. %, 2-phosphonopropionic acid triethyl ester=26.1 wt. %.

Example F (Comparison)

Production of a DMC catalyst with polypropylene glycol diglycidyl ether without 2-phosphonopropionic acid triethyl ester (catalyst F)

The same method was used as in Example D (comparison), except that polypropylene glycol diglycidyl ether having an average molar mass of 640 (Aldrich) was used instead of the glycerol tricaproate from Example D.

Yield of dried, pulverulent catalyst: 6.0 g Elemental analysis, thermogravimetric analysis and extraction: Cobalt=8.7 wt. %, zinc=20.2 wt. %, tert.-butanol=4.2 wt. %, polypropylene glycol diglycidyl ether ligand=30.5 wt. %.

Example G (Comparison)

Production of a DMC catalyst with a polyester without cholic acid sodium salt (catalyst G)

The same method was used as in Example D (comparison), except that a polyester prepared from adipic acid and diethylene glycol and slightly branched by trimethylolpropane having an average molar mass of 2300 (OH value=50 mg of KOH/g) was used instead of the glycerol tricaproate from Example D.

Yield of dried, pulverulent catalyst: 3.9 g Elemental analysis, thermogravimetric analysis and extraction: Cobalt=12.2 wt. %, zinc=25.7 wt. %, tert.-butanol=7.1 wt. %, polyester=12.3 wt. %.

Example H (Comparison)

Production of a DMC catalyst with cholic acid sodium salt without polyester (catalyst H)

The same method was used as in Example D (comparison), except that cholic acid sodium salt was used instead of the glycerol tricaproate from Example D. Yield of dried, pulverulent catalyst: 4.2 g Elemental analysis, thermogravimetric analysis and extraction: Cobalt=12.6 wt. %, zinc=27.3 wt. %, tert.-butanol=10.9 wt. %, cholic acid sodium salt=4.3 wt. %.

Production of Polyether Polyols

General Method 50 g of polypropylene glycol starter compound (number average molecular weight=1000 g/mol) and 5 mg of catalyst (25 ppm, relative to the quantity of polyether polyol to be produced) are initially introduced into a 500 ml autoclave under protective gas (argon) and heated to 105° C. while being stirred. Propylene oxide (approx. 5 g) is then added in a single portion until the total pressure has risen to 2.5 bar. No further propylene oxide is then apportioned until an accelerated pressure drop is observed in the reactor. This accelerated pressure drop indicates that the catalyst has been activated. The remaining propylene oxide (145 g) is then continuously apportioned at a constant total pressure of 2.5 bar. Once all the propylene oxide has been apportioned and after 2 hours' post-reaction at 105° C., volatile fractions are removed by distillation at 90° C. (1 mbar) and the temperature then reduced to room temperature.

The resulting polyether polyols were characterised by determining their OH values, double bond contents and viscosities.

The course of the reaction was monitored using time/conversion curves (propylene oxide consumption [g] vs. reaction time [min]). The induction time was determined from the intersection of the tangent to the steepest point of the time/conversion curve with the extended baseline of the curve. The propoxylation times of significance to catalyst activity correspond to the period between catalyst activation (end of induction period) and completion of propylene oxide addition. The total reaction time is the sum of the induction time and propoxylation time.

EXAMPLE 1

| Production of polyether polyol with catalyst A (25 ppm) | |
|---|---|
| Induction time: | 100 min |
| Propoxylation time: | 40 min |
| Total reaction time: | 140 min |

-continued

| Production of polyether polyol with catalyst A (25 ppm) | |
|---|---|
| Polyether polyol: | |
| OH value (mg KOH/g): | 29.4 |
| Double bond content (mmol/kg): | 9 |
| Viscosity, 25° C. (mPas): | 845 |

EXAMPLE 2

| Production of polyether polyol with catalyst B (25 ppm) | |
|---|---|
| Induction time: | 140 min |
| Propoxylation time: | 37 min |
| Total reaction time: | 177 min |
| Polyether polyol: | |
| OH value (mg KOH/g): | 30.0 |
| Double bond content (mmol/kg): | 7 |
| Viscosity, 25° C. (mPas): | 821 |

EXAMPLE 3

| Production of polyether polyol with catalyst C (25 ppm) | |
|---|---|
| Induction time: | 80 min |
| Propoxylation time: | 27 min |
| Total reaction time: | 107 min |
| Polyether polyol: | |
| OH value (mg KOH/g): | 30.1 |
| Double bond content (mmol/kg): | 7 |
| Viscosity, 25° C. (mPas): | 863 |

If the catalyst is not removed, the metal content in the polyol is: Zn=5 ppm, Co=2 ppm.

EXAMPLE 4 (COMPARISON)

| Production of polyether polyol with catalyst D (25 ppm) | |
|---|---|
| Induction time: | 166 min |
| Propoxylation time: | 291 min |
| Total reaction time: | 457 min |
| Polyether polyol: | |
| OH value (mg KOH/g): | 30.9 |
| Double bond content (mmol/kg): | 8 |
| Viscosity, 25° C. (mPas): | 874 |

EXAMPLE 5 (COMPARISON)

| Production of polyether polyol with catalyst E (25 ppm) | |
|---|---|
| Induction time: | 99 min |
| Propoxylation time: | 110 min |
| Total reaction time: | 209 min |
| Polyether polyol: | |
| OH value (mg KOH/g): | 29.9 |

-continued

| Production of polyether polyol with catalyst E (25 ppm) | |
|---|---|
| Double bond content (mmol/kg): | 10 |
| Viscosity, 25° C. (mPas): | 862 |

EXAMPLE 6 (COMPARISON)

| Production of polyether polyol with catalyst F (25 ppm) | |
|---|---|
| Induction time: | 154 min |
| Propoxylation time: | 37 min |
| Total reaction time: | 191 min |
| Polyether polyol: | |
| OH value (mg KOH/g): | 30.7 |
| Double bond content (mmol/kg): | 7 |
| Viscosity, 25° C. (mPas): | 809 |

EXAMPLE 7 (COMPARISON)

| Production of polyether polyol with catalyst G (25 ppm) | |
|---|---|
| Induction time: | 130 min |
| Propoxylation time: | 150 min |
| Total reaction time: | 280 min |
| Polyether polyol: | |
| OH value (mg KOH/g): | 29.5 |
| Double bond content (mmol/kg): | 5 |
| Viscosity, 25° C. (mPas): | 861 |

EXAMPLE 8 (COMPARISON)

| Production of polyether polyol with catalyst H (25 ppm) | |
|---|---|
| Induction time: | 217 min |
| Propoxylation time: | 33 min |
| Total reaction time: | 250 min |
| Polyether polyol: | |
| OH value (mg KOH/g): | 29.6 |
| Double bond content (mmol/kg): | 6 |
| Viscosity, 25° C. (mPas): | 855 |

Under the reaction conditions described above, catalysts A–C, which contain two complex-forming components apart from tert.-butanol, exhibit higher activity than catalysts D–H, which contain only one complex ligand apart from tert.-butanol.

Catalyst A, which contains both glycerol tricaproate and 2-phosphonopropionic acid triethyl ester as complex-forming components, thus exhibits substantially higher activity, in particular with regard to propoxylation time, than do catalysts D or E, which contain glycerol tricaproate or 2-phosphonopropionic acid triethyl ester respectively as the complex-forming component.

Examples 1–3 show that, by virtue of their distinctly increased activity, tie novel DMC catalysts according to the invention may be used in the production of polyether polyol in such low concentrations that it is possible to dispense with removing the catalyst from the polyol.

What is claimed is:

1. A double metal cyanide catalyst comprising:
 a) at least one double metal cyanide compound;
 b) at least one organic complexing ligand;
 c) at least two complexing components chosen from polyether; polyester; polycarbonate; polyalkylene glycol sorbitan ester; polyalkylene glycol glycidyl ether; polyacrylamide; poly(acrylamide-co-acrylic acid); polyacrylic acid; poly(acrylic acid-co-maleic acid); polyacrylonitrile; polyalkyl acrylate; polyalkyl methacrylate; polyvinyl methyl ether; polyvinyl ethyl ether; polyvinyl acetate; polyvinyl alcohol; poly-N-vinylpyrrolidone; poly(N-vinylpyrrolidone-co-acrylic acid); polyvinyl methyl ketone; poly(4-vinylphenol); poly(acrylic acid-co-styrene); oxazoline polymer; polyalkyleneimine; maleic acid and maleic anhydride copolymers; hydroxyethylcellulose; polyacetal; glycidyl ether; glycoside; carboxylic acid esters of polyhydric alcohol; bile acid or its salt, ester or amide thereof; cyclodextrins; phosphorus compounds; $\alpha,\beta$-unsaturated carboxylic acid esters; or ionic surface- or interface-active compounds,
 wherein complexing components c) are not the same as organic complexing ligand b).

2. The double metal cyanide catalyst according to claim 1, further comprising water and/or one or more water-soluble metal salts.

3. The double metal cyanide catalyst according to claim 1, wherein the double metal cyanide compound is zinc hexacyanocobaltate (III).

4. The double metal cyanide catalyst according to claim 1, wherein the organic complexing ligand is tert.-butanol.

5. The double metal cyanide catalyst according to claim 1, wherein the double metal cyanide catalyst comprises up to about 80 wt. %, based on the total weight of the double metal cyanide catalyst, of a mixture of complexing components c).

6. A process for preparing a double metal cyanide catalyst comprising:
 (1) reacting, in aqueous solution, (i) at least one metal salt, (ii) with at least one metal cyanide salt, in the presence of (iii) at least one organic complexing ligand to form a suspension;
 (2) treating the suspension with at least two complexing components chosen from polyether; polyester; polycarbonate; polyalkylene glycol sorbitan ester, polyalkylene glycol glycidyl ether; polyacrylamide; poly(acrylamide-co-acrylic acid); polyacrylic acid; poly(acrylic acid-co-maleic acid); polyacrylonitrile; polyalkyl acrylate; polyalkyl methacrylate; polyvinyl methyl ether; polyvinyl ethyl ether; polyvinyl acetate; polyvinyl alcohol; poly-N-vinylpyrrolidone; poly(N-vinylpyrrolidone-co-acrylic acid); polyvinyl methyl ketone; poly(4-vinylphenol); poly(acrylic acid-co-styrene); oxazoline polymer; polyalkyleneimine; maleic acid and maleic anhydride copolymers; hydroxyethylcellulose; polyacetal; glycidyl ether; glycoside; carboxylic acid esters of polyhydric alcohol; bile acid or its salt, ester or amide thereof; cyclodextrins; phosphorus compounds; $\alpha,\beta$-unsaturated carboxylic acid esters; or ionic surface- or interface-active compounds to form a double metal cyanide catalyst,
 wherein the complexing components are not the same as the organic complexing ligand;
 (3) isolating the double metal cyanide catalyst from the suspension;
 (4) washing the double metal cyanide catalyst; and
 (5) drying the double metal cyanide catalyst.

* * * * *